Oct. 14, 1969  D. R. OJARD  3,472,088
RAIN RATE GAUGE
Filed Aug. 18, 1967

INVENTOR.
DENNIS R. OJARD
BY
ATTORNEY

United States Patent Office

3,472,088
Patented Oct. 14, 1969

3,472,088
RAIN RATE GAUGE
Dennis R. Ojard, Renton, Wash., assignor to the United States of America as represented by the Secretary of the Air Force
Filed Aug. 18, 1967, Ser. No. 661,727
Int. Cl. G01w 1/14
U.S. Cl. 73—171                  3 Claims

ABSTRACT OF THE DISCLOSURE

Device for giving both instantaneous and time period readings of rate of rain. Two metal plates are mounted on separate resistance thermometers and one of them is heated so that a constant and predetermined temperature difference is maintained between them.

---

Various devices have been used in the past to determine the rate of rain. Most of these require cumbersome and complicated mechanisms. For example, a tank for receiving rain is mounting on one side of a scale and a recording pin is mounted on the other. The actual rain is thus weighed. In other devices energy used in vaporization serves as a proportionate measure of rainfall.

The present invention seeks to overcome the difficulties experienced in this field by providing very simply two small plates upon which the rain falls.

Further, the invention utilizes the amount of energy required to maintain these two plates which are exposed to the same rain-fall conditions at a predetermined temperature differential. One element—the one maintained at the lower temperature—senses the temperature of the air and of the rain, and from the amount of energy required to maintain this differential, the rate of rainfall may be determined. By making the elements very small, and the temperature differential also small, the device operates on very slight power expenditure. The rain rate can be calculated from the power required to heat the plates, but this calculation is dependent upon a number of unknown parameters as follows: The temperature of the rain water as it leaves the plate is dependent upon the temperature of the second plate; the slope of the plate; the plate's thermal conductivity; the heat losses to the surroundings not including rain; and the friction between the plate and the rain, that is, the speed with which the rain leaves the plate. Because of all these variables and the difficulty of determining each parameter, the system is calibrated against a standard total rainfall measuring device as a function of time, in other words, an empirical calibration is done on each instrument.

Figure 1:
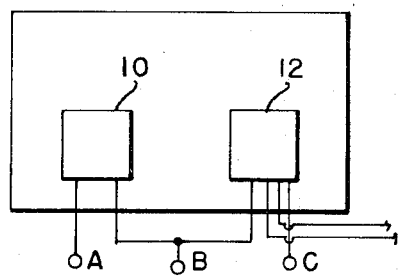
Figure 2:
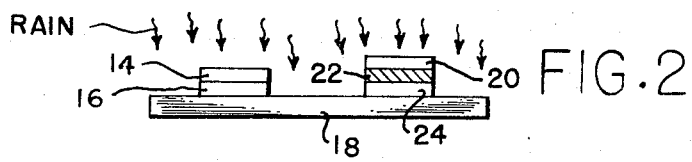
Figure 3:
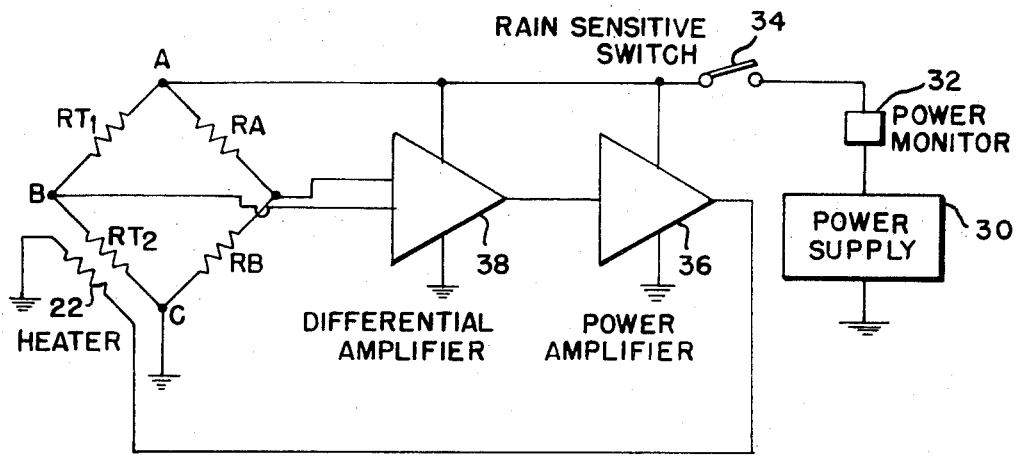

In the drawing:
FIGURE 1 is a top plan view of the sensing device;
FIGURE 2 is a front elevational view of the two plates mounted side by side on a support; and
FIGURE 3 is a circuit diagram showing the arrangement of the fundamental electrical elements.

Referring more in detail to the drawing, the plates above referred to are indicated at 10 and 12. The element 10 is comprised of a copper plate 14 and a resistance thermometer 16 mounted on a plate 18. The second element 12 comprises a copper plate 20, a heater 22 and a resistance thermometer 24.

The elements 10 and 12 may be mounted side by side on a single plate 18. They must, of course, be exposed to the same conditions of rainfall.

The element 10 has no heater and therefore the temperature $T_1$ shown on the thermometer 16 is the temperature condition of air and rain. The heating element 22 is comprised of Nichrome wire or any wire of similar characteristics, and copper is used for plates 14 and 20 for the rain collecting elements.

When no rain is falling, element 12 is maintained at a temperature which is 5° F. higher than that of the element 10. As the rain starts to fall the plate 12 is cooled in an amount comparable to the amount of rain falling upon it. FIGURE 3 shows the elements of the electrical circuit. A power supply 30 is monitored by the monitor 32, and is cut in and out by the rain sensitive switch 34. Two amplifiers 36 and 38 are provided, one for power amplification and the other for the differential which is measured across the bridge A–B–C containing the resistance thermometers $RT_1$ and $RT_2$, which correspond to elements 16 and 24, respectively. The temperature sensing network shown in FIGURE 3 senses the change in differential and compensates for it by applying power to the heater 22 to maintain the plate 12 at its original temperature differential. As the rain rate increases the power required increases, and vice versa. By recording the amount of power required to bring the plate 12 back to the predetermined temperature differential of 5°, we have a direct correlation between the rainfall rate and the power required for this operation. Integration of the rain rate over a period of time gives the amount of rainfall and, differentiation over short periods of time provides the rate of change of rain rate. If the rain is at a different temperature than the ambient air, the first sensing element 10 "sees" the difference and the electronics automatically compensates for this difference. The cooling effect of the rain on heated plate 12 can then operate to provide a measure of the rain rate. Resistance thermometers were used as temperature sensing elements since they were readily available and easily placed in bridge circuits for control purposes. The heater may be made, for example, of Nichrome wire and kept thin. The elements 10 and 12 can be made .75" x .75" to match a resistance thermometer of the same size. The power requirements are thus kept low as the elements are reduced in size. The temperature differential of 5° is arbitrary. The power requirement increases as this differential increases.

In FIG. 3, the power monitor also monitors the system losses of the bridge network and the amplifiers. Calibrating the system against a known total rainfall measuring device will account for these losses. The power monitor could also be placed between 36 and 22 and eliminate the inclusion of the above losses. In any event, the power required to heat the plate in order to maintain the required temperature will be a definite function of the rainfall rate. The power amplifier may not be necessary. In a small portable system, most differential amplifiers could handle the small power requirements, thereby eliminating the power amplifier. The total rainfall can be determined by integrating the calibrated instrument output over the period of time of interest. A working model showed a linear output as a function of rain rate.

The system is sensitive to convectional cooling, and accordingly should be protected from wind. The plates should also be placed at an angle to be horizontal so that rain will not accumulate and will readily drain from the plate.

The switch 34 is optional. With its use, the system is completely automatic since it operates only in the presence of rain.

This system presents great possibilities for weather stations for providing both instantaneous rain rate, and rain rate over an extended time period.

Although the invention has been described with reference to a particular embodiment, it will be understood to those skilled in the art that the invenion is capable of a variety of alternative embodiments within the spirit and scope of the appended claims.

I claim:
1. A rain rate gauge comprising a pair of tilted plates located in proximity to each other to receive identical amounts of rain, a resistance thermometer closely attached to each plate to record the temperature of each plate, a heater for heating one of said plates, means for maintaining a predetermined temperature differential between said plates, and means for monitoring the amount of power consumed in maintaining the predetermined temperature differential.

2. The device as claimed in claim 1, wherein said first named means comprises an electrical circuit including a bridge introduced between said resistance thermometers and including also a temperature differential amplifier.

3. In a rain rate gauge as claimed in claim 2, rain sensitive means for rendering the operation of the device automatic.

References Cited
UNITED STATES PATENTS

| | | | |
|---|---|---|---|
| 2,443,687 | 6/1948 | Marguard | 200—61.04 |
| 2,740,293 | 4/1956 | Brady | 73—171 |
| 3,085,431 | 4/1963 | Yerman et al. | 73—204 |

RICHARD C. QUEISSER, Primary Examiner

C. E. SNEE, Assistant Examiner